United States Patent
Yang

(10) Patent No.: US 12,418,163 B2
(45) Date of Patent: Sep. 16, 2025

(54) EASY-TO-USE WIRE STRIPPING MACHINE

(71) Applicant: Yueqing Wending Electromechanical Co., Ltd, Wenzhou (CN)

(72) Inventor: Yunhai Yang, Wenzhou (CN)

(73) Assignee: Yueqing Wending Electromechanical Co., Ltd., Wenzhou (CN)

( * ) Notice: Subject to any disclaimer, the term of this patent is extended or adjusted under 35 U.S.C. 154(b) by 179 days.

(21) Appl. No.: 18/522,047

(22) Filed: Nov. 28, 2023

(65) Prior Publication Data
US 2025/0125596 A1 Apr. 17, 2025

(51) Int. Cl.
*H02G 1/12* (2006.01)

(52) U.S. Cl.
CPC .................... *H02G 1/126* (2013.01)

(58) Field of Classification Search
CPC ..................... H02G 1/126; H02G 1/1248
USPC ............................. 30/90.9, 90.4, 90.8
See application file for complete search history.

(56) References Cited

U.S. PATENT DOCUMENTS

| | | | | |
|---|---|---|---|---|
| 2,647,309 A * | 8/1953 | Chisena | ............... | H02G 1/1217 30/90.9 |
| 5,979,286 A * | 11/1999 | Burth | ................... | H01B 15/006 83/947 |
| 2011/0010945 A1* | 1/2011 | Delafosse | .............. | H02G 1/126 83/435 |
| 2014/0318323 A1* | 10/2014 | Zhang | .................. | H02G 1/1221 81/9.51 |
| 2024/0413620 A1* | 12/2024 | Chen | .................... | H02G 1/1248 |

* cited by examiner

*Primary Examiner* — Phong H Nguyen
(74) *Attorney, Agent, or Firm* — Westbridge IP LLC

(57) ABSTRACT

A wire stripping machine includes a base plate with a support frame and a cover plate. A threaded rod on the cover plate is connected to a sliding rod. The support frame contains a sliding groove with a sliding piece and connecting block. The sliding rod is fitted with a sleeve and has an adjusting bolt and elastic member. The support frame has a rolling rod with two feed wheels that can slide axially and have elastic members. This machine can handle wires with small diameter differences, reduce workload, and adjust the feed wheel gap based on wire diameter, enhancing versatility.

8 Claims, 4 Drawing Sheets

EASY-TO-USE WIRE STRIPPING MACHINE

CROSS-REFERENCE TO RELATED APPLICATIONS

This application claims priority to Chinese Patent Application No. 202322749532.2, filed on Oct. 13, 2023, the content of which is incorporated herein by reference in its entirety.

TECHNICAL FIELD

The present application relates to the field of wire stripping machines, specifically to a wire stripping machine that is easy to use.

BACKGROUND

A wire stripping machine is a machine that removes the plastic outer covering of wires and the metal core.

For example, a horizontal electric wire stripping machine disclosed in Chinese Patent Publication CN206442067U includes a wire stripping machine body, an electric motor, a gearbox, and a fixed bracket. The driving force of the electric motor is input into the wire stripping machine body through the gearbox. The fixed bracket includes a fixed end that is connected to the outer wall of the gearbox and an installation end that extends upward. The installation end is connected to a button switch, which completely changes the connection method of the button switch of the existing wire stripping machine. Firstly, the above setting provides a stable installation position for the button switch, making the support force of the button switch stronger. Secondly, due to the fixed position of the button switch, the user can touch a specific position every time, making it more convenient to press. Thirdly, the overall lateral floor space of the equipment is greatly reduced, with high structural compactness.

However, when stripping wires, workers need to adjust the travel of the sliding parts even for wires with small diameter differences, which increases the workload of workers. Moreover, the spacing between the feed wheels is fixed, making it impossible to change the spacing between the two feed wheels according to the diameter of the wire, resulting in the feed wheels being unable to fit and clamp the wire during the transmission of wires with different diameters. This reduces the frictional force and causes the feed wheels to slip on the surface of the wire during the transmission of the wire, which is not conducive to use.

SUMMARY

The present application provides an easy-to-use wire stripping machine to solve the problems presented in the prior art.

To achieve the above objectives, the present application provides the following technical solution.

An easy-to-use wire stripping machine includes a base plate, with a support frame on the top side of the base plate, and a cover plate on the top of the support frame. A threaded rod passes through the cover plate, with a sliding rod at the bottom of the threaded rod. A sliding groove is provided inside the support frame, with a sliding piece sliding inside the sliding groove. The top of the sliding piece has a connecting block, and a sleeve is provided on top of the connecting block, which is fitted on the outside of the sliding rod. The sliding piece is slidably connected to the sliding rod, with an adjusting bolt on the threaded rod and a first elastic member sleeved on the threaded rod. A rolling rod is rotatably provided at the bottom of the support frame, with two symmetrical feed wheels on the rolling rod, each with a second elastic member on the outside, and both feed wheels are axially slidable along the rolling rod.

Preferably, the sleeve has an oil storage groove inside, with oil seals at the top and bottom of the sleeve.

Preferably, the middle of the top surface of the sliding piece has an avoidance groove.

Preferably, the two ends of the first elastic member are respectively abutted against the bottom of the adjusting bolt and the top of the connecting block.

Preferably, the two ends of the second elastic member are respectively abutted against the sliding groove and the outside of the feed wheel.

Preferably, the bottom of the sliding piece is rotatably provided with a cutting roller.

Preferably, the top of the threaded rod has an operating handle, and the bottom of the sliding rod has a limit block.

Preferably, the front end of the support frame is provided with a front cover, and the bottom of the front end of the support frame is provided with a wire guide plate, with several wire holes on the surface of the wire guide plate.

At least one of the following technical effects is achieved by one or more of the above technical solutions provided in the embodiments of the present application.

By using the above technical solutions, when facing different wires with small diameter differences for wire stripping, the cutting roller can slide up and down with short strokes due to the wire compression, adapting to wires with small diameter differences. Therefore, when using wires with small diameter differences, the stroke of the sliding piece only needs to be adjusted once, reducing the workload of the workers. By providing the necessary force to press the cutting roller downward with the first elastic member, the cutting roller can fit tightly with the wire and cut the insulation layer on the wire surface. When facing copper conductors or other metal conductors with higher hardness under the insulation layer of the wire, the force provided by the first elastic member makes the cutting roller not enough to cut off the metal conductor, thereby ensuring that the metal conductor will not be greatly damaged while cutting the insulation layer. At the same time, the feed wheels move to both sides according to the wire compression of different diameters, and under the action of the second elastic member, the feed wheels are squeezed inward, thereby realizing the clamping of wires with different diameters, improving the applicability of the feed wheels, increasing the contact area between the feed wheels and the wire surface of different diameters, and avoiding slippage between the feed wheels and the wire surface during wire transmission.

DETAILED DESCRIPTION OF THE EMBODIMENTS

Figure 1:
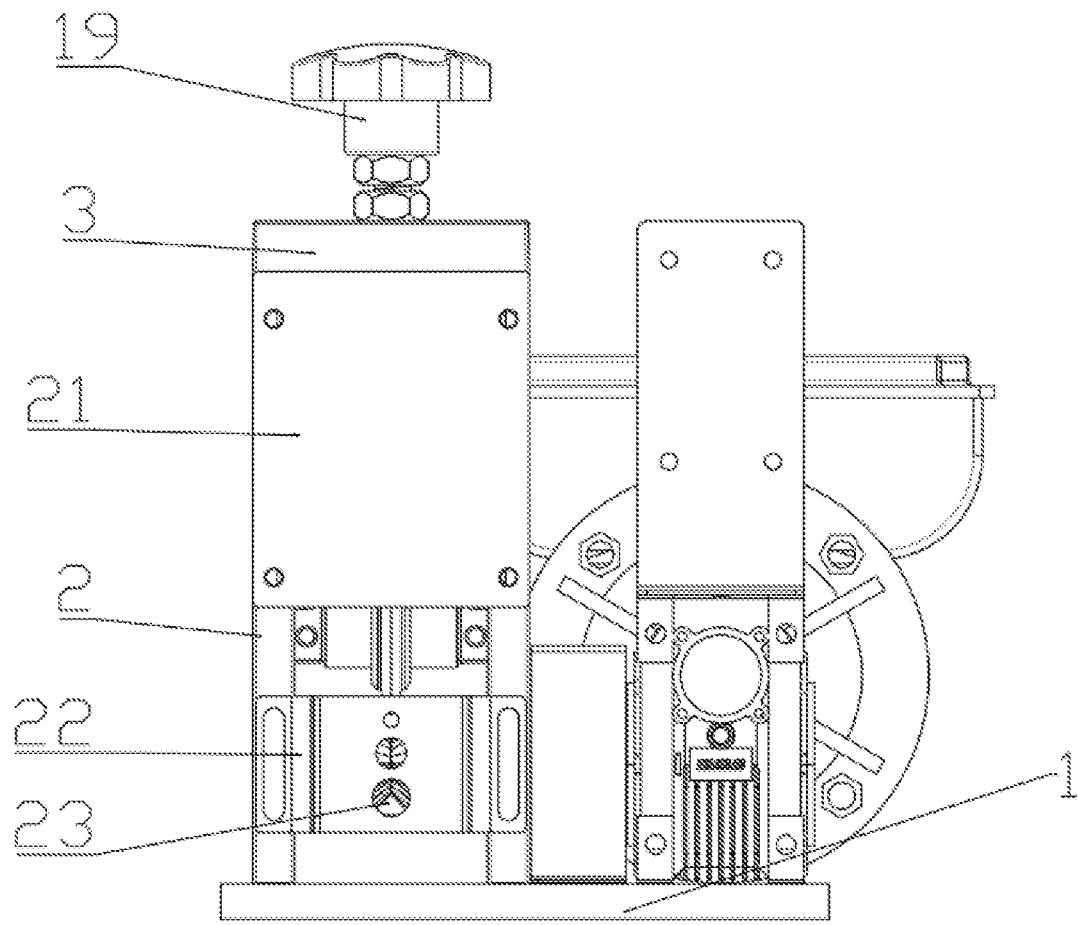
FIG. 1 is a schematic diagram of the overall structure of the present application.

The following will combine the implementation examples to clearly and completely describe the technical solution of the present application. The described embodiments are part of the embodiments of the present application, not all of them. Based on the embodiments of the present application, all other embodiments obtained by those skilled in the art without inventive work are within the scope of protection of the present application.

It is to be understood in the description of the present application that the positional relationship indicated by terms such as "up," "down," "left," and "right" is based on the orientation or positional relationship shown in the drawings. This is only for the convenience of describing and simplifying the description of the present application, and does not indicate or imply that the device or component referred to must have a specific orientation, or be constructed and operated in a specific orientation. Therefore, it should not be construed as limiting the present application.

Figure 2:
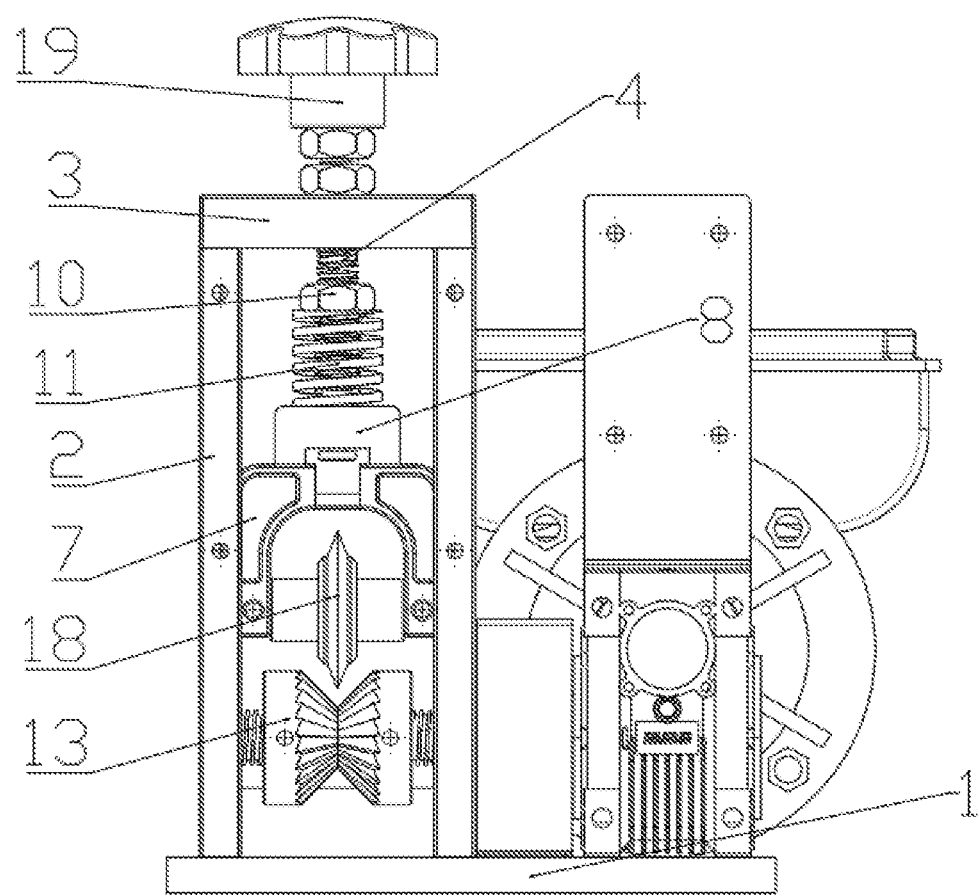
FIG. 2 is a schematic diagram of the internal structure of the present application.
Figure 3:
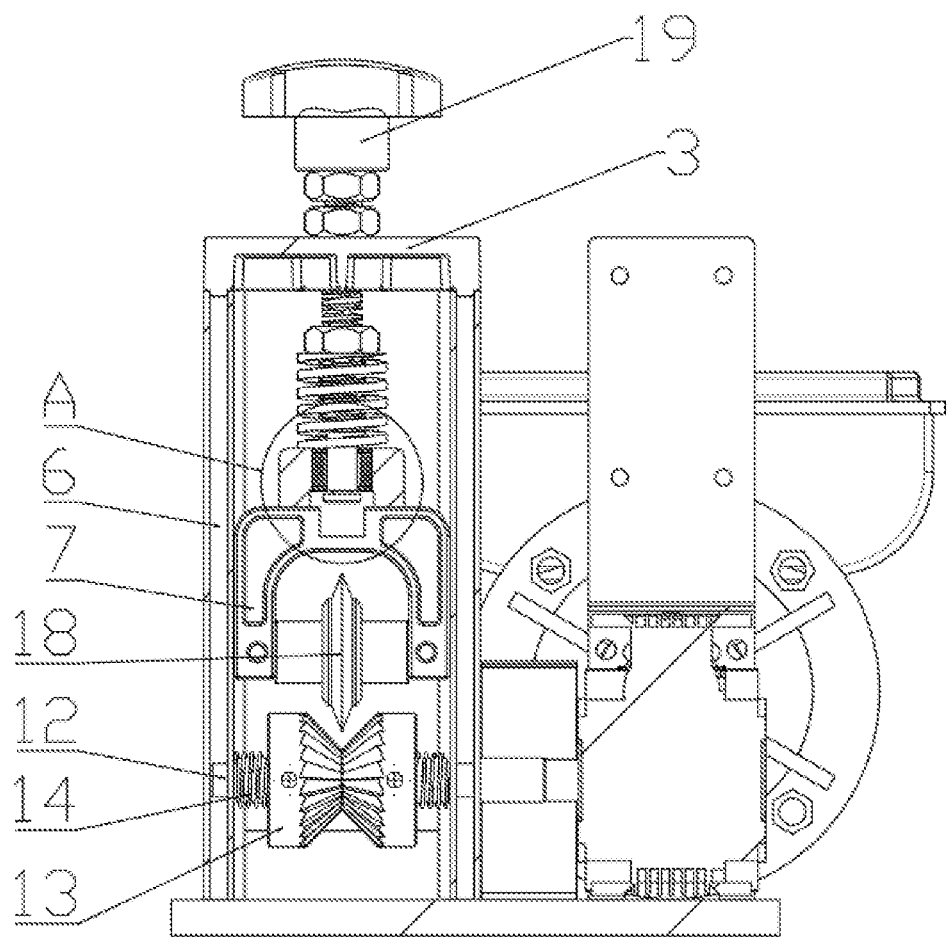
FIG. 3 is a schematic diagram of a partial sectional structure of the present application.
Figure 4:
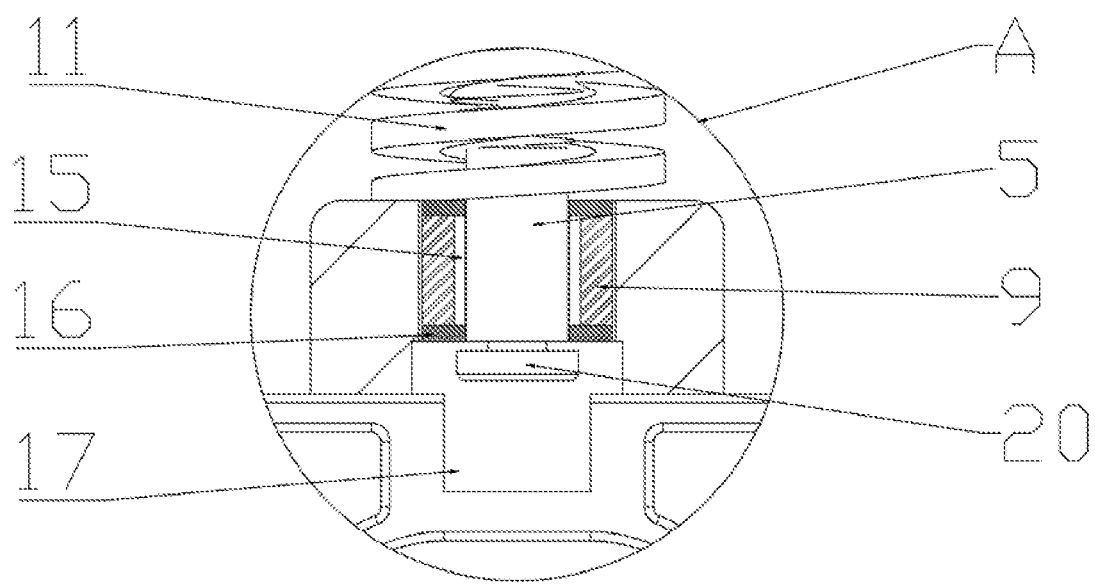
FIG. 4 is a schematic diagram of a partial enlarged structure at A in the present application.

As shown in FIGS. 1-4, disclosed is a schematic diagram of an easy-to-use wire stripping machine according to a preferred embodiment of the present application.

In this embodiment, an easy-to-use wire stripping machine includes a base plate 1, a support frame 2 on one side of the top of the base plate 1, a driving mechanism on the other side of the base plate 1, a cover plate 3 on the top of the support frame 2, a threaded rod 4 passing through the cover plate 3, and a sliding rod 5 at the bottom of the threaded rod 4. The support frame 2 is provided with a sliding groove 6, and a sliding piece 7 is slidably provided in the sliding groove 6. The sliding piece 7 is provided with a connecting block 8 at the top, and the connecting block 8 is provided with a sleeve 9 at the top. The sleeve 9 is sleeved on the outside of the sliding rod 5. The sliding piece 7 is slidably connected to the sliding rod 5, and the sliding piece 7 can slide axially along the sliding rod 5. The threaded rod 4 is provided with an adjusting bolt 10, and a first elastic member 11 is sleeved on the threaded rod 4. The support frame 2 is provided with a rolling rod 12 at the bottom, and a pair of symmetrical feed wheels 13 are provided on the rolling rod 12. The outer side of the feed wheel 13 is provided with a second elastic member 14. The feed wheel 13 can slide axially along the rolling rod 12, and the feed wheel 13 is in a limited state in the radial direction of the rolling rod 12, so the feed wheel 13 can only slide axially along the rolling rod 12. When the rolling rod 12 rotates, it drives the feed wheel 13 to rotate, thereby driving the wire to be conveyed.

In this embodiment, the sleeve 9 is internally provided with an oil storage groove 15, and lubricating oil is injected into the oil storage groove during use to reduce the friction between the sliding rod and the sleeve. The top and bottom of the sleeve 9 are both provided with oil seals 16 to prevent lubricating oil leakage.

In this embodiment, the middle of the top surface of the sliding piece 7 is provided with an avoidance groove 17, which acts to avoid the position of the sliding rod 5, preventing interference between components.

In this embodiment, the two ends of the first elastic member 11 are respectively abutted against the bottom of the adjusting bolt 10 and the top of the connecting block 8, providing vertical elastic potential energy to the connecting block 8 through the first elastic member 11, thereby applying downward pressure to the sliding piece 7, enabling the cutting roller 18 to cut the insulation layer of the wire.

In this embodiment, the two ends of the second elastic member 14 are respectively abutted against the sliding groove 6 and the outer side of the feed wheel 13, providing lateral elastic potential energy to the feed wheel 13, enabling the feed wheel 13 to grip the wire.

In this embodiment, the bottom of the sliding piece 7 is provided with a tangent cutting roller 18, which cuts the insulation layer of the wire. The sliding piece 7 drives the tangent cutting roller 18 to perform short up and down strokes, thereby adaptively adjusting wires with slightly different diameters.

In this embodiment, the top of the threaded rod 4 is provided with an operating handle 19, which is used to rotate the threaded rod 4 for up and down movement, thereby adjusting the stroke of the sliding piece 7. The bottom of the sliding rod 5 is provided with a limiting block 20 to prevent the sliding rod 5 from slipping out of the sleeve 9.

In this embodiment, the front end of the support frame 2 is provided with a front cover 21, which serves as a protective cover for the inside of the wire stripping machine, and prevents splashing of debris during cutting. The bottom of the front end of the support frame 2 is provided with a wire guide plate 22, the position of which can be adjusted up and down. The surface of the wire guide plate 22 is provided with several wire holes 23, each with a different diameter, through which the wire enters the cutting area.

When in use, for stripping different wires with small differences in diameter, the sliding piece 7 is adjusted to the appropriate position using the operating handle 19. The cutting roller 18 can perform short up and down strokes due to the pressure from the wires, automatically adjusting for wires with slightly different diameters. Therefore, when dealing with wires with small differences in diameter, the stroke of the sliding piece only needs to be adjusted once, reducing the workload for the operator. The first elastic member 11 provides the necessary downward pressure for the cutting roller 18, allowing it to fit against the wire and cut the insulation layer on the wire's surface. When faced with copper or other metal conductors with higher hardness under the wire's insulation layer, the force provided by the first elastic member 11 prevents the cutting roller 18 from cutting through the metal conductors, ensuring that the insulation layer can be cut without causing significant damage to the metal conductors. Additionally, the feed wheel 13 is designed to move to the sides according to the pressure from wires of different diameters, and with the action of the second elastic member 14, the feed wheel 13 is inwardly compressed, achieving a better grip on wires of different diameters, improving its versatility and increasing the contact area between the feed wheel 13 and wires of different diameters, preventing slippage during wire transmission.

The installation, connection, or setting of the wire stripping machine of the present application is achieved through common mechanical methods that provide beneficial effects, and any such method can be implemented.

The techniques not detailed in the present application are well-known in the art, and those skilled in the art can easily implement the present application based on the present specification. The content represented in the drawings is part of this specification.

The above content provides a further detailed explanation of the present application based on specific embodiments. It should not be construed that the specific implementation of the present application is limited to these explanations. For those skilled in the art to which the present application belongs, under the premise of not departing from the concept of the present application, several simple deductions or substitutions can be made, which should be considered as falling within the scope of protection determined by the claims submitted for the present application.

What is claimed is:

1. An easy-to-use wire stripping machine, comprising a base plate, with a support frame located at one end of a top of the base plate, and a cover plate positioned at a top of the support frame, wherein the cover plate is pierced by a threaded rod, a bottom of the threaded rod is provided with a sliding rod, and the support frame contains a sliding groove in which a sliding piece is slidably mounted, a top of the sliding piece is provided with a connecting block, and a top of the connecting block is provided with a sliding sleeve, which is sleeved on an outside of the sliding rod, the sliding piece is slidably connected to the sliding rod, and the threaded rod is provided with an adjusting bolt and a first elastic member, a bottom of the support frame is rotatably provided with a rolling rod, on which two symmetrical feed wheels are mounted, outer sides of the feed wheels are provided with second elastic members, and the feed wheels can slide axially along the rolling rod.

2. The easy-to-use wire stripping machine according to claim 1, wherein the sleeve is internally provided with an oil storage groove, and top and bottom of the sleeve are both provided with oil seals.

3. The easy-to-use wire stripping machine according to claim 1, wherein a middle of a top surface of the sliding piece is provided with an avoidance groove.

4. The easy-to-use wire stripping machine according to claim 1, wherein two ends of the first elastic member are respectively abutted against a bottom of the adjusting bolt and the top of the connecting block.

5. The easy-to-use wire stripping machine according to claim 1, wherein two ends of the second elastic member are respectively abutted against the sliding groove and a outer side of the feed wheel.

6. The easy-to-use wire stripping machine according to claim 1, wherein a bottom of the sliding piece is rotatably provided with a cutting roller.

7. The easy-to-use wire stripping machine according to claim 1, wherein a top of the threaded rod is provided with an operating handle, and the bottom of the sliding rod is provided with a limiting block.

8. The easy-to-use wire stripping machine according to claim 1, wherein a front end of a top of the support frame is provided with a front cover, and a bottom of the front end of the support frame is provided with a wire guide plate, on a surface of which several wire holes are opened.

* * * * *